UNITED STATES PATENT OFFICE.

MAX MEIROWSKY, OF COLOGNE-LINDENTHAL, GERMANY.

METHOD OF MANUFACTURING STRATIFIED FIBROUS MATERIALS.

1,124,777.  Specification of Letters Patent.  Patented Jan. 12, 1915.

No Drawing.   Application filed June 27, 1914.   Serial No. 847,720.

*To all whom it may concern:*

Be it known that I, MAX MEIROWSKY, subject of the King of Prussia, German Emperor, and resident of Cologne-Lindenthal, Germany, have invented certain new and useful Improvements in Methods of Manufacturing Stratified Fibrous Materials, of which the following is a specification, reference being had therein to the accompanying drawing.

This invention relates to the manufacture of stratified fibrous materials, more particularly for chemical and electrical insulating purposes.

Hitherto paper has been impregnated with oils in order to increase its di-electric strength and in order to close the pores so that the separate fibers are protected against outside attack of chemical reagents. A paper so treated, however, has no adhesive properties so that it cannot be worked in different layers into plates or tubes, much less into bodies of greater mechanical strength.

Now according to the invention a stratified fibrous material is produced by impregnating the separate layers of paper not only with oil material—and that lightly—but after this treatment they are overlaid with a resinous material, whereupon the separate layers are joined in known manner by application of pressure and heat. In this way the resin does not serve to impregnate the paper in the known manner but only as a means to stick the separate paper layers together reliably, notwithstanding the previous saturating in oil, and to give mechanical strength to it. The resulting bodies or materials are capable of resistance to the greatest extent mechanically and chemically, as well as electrically.

In the stratified bodies or materials hitherto known the separate layers of which were treated with resin varnish, upon application of the pressure and heat the varnish partly flowed out and was driven out from the fibers of the paper, which owing to this were partly made capable of taking up other liquids or atmospheric moisture. All the same, materials and bodies of this kind have proved valuable to a prominent extent, particularly in the electrical industry, but also in the chemical industry, especially when a synthetic resin was employed instead of a vegetable resin. In the present process, however, the oil varnish which has passed into the fibers of the paper remains unchanged in its place, in spite of the pressure and the heat, while the resin varnish becoming liquid intimately connects together the superposed sheets of paper. Such finished materials or bodies of materials hitherto have been treated only with resin. Chemical reagents which are capable of gradually destroying the resinous layers are met in the material produced according to the novel process with a resistance in the inclosed layers of oil. This resistance is so great that the paper bodies can be employed in the chemical industry, for example, for storing and conducting etching liquids, while in the electrical industry they are used for insulators in secondary batteries, oil switches, transformers and such like oil or in apparatus working in damp places.

The separate sheets of paper treated with oil and resin can be united under pressure and heat by piling several layers one upon another and uniting in the press, or, however, according to the roller process in such a manner that a continuous sheet of paper is warmed and subjected to suitable pressure and wound around a core. In this way plates or tubes and cylindrical bodies result as is in itself known. The resinous material can be vegetable or synthetic. Instead of paper, which preferably is chosen quite thin, other fibrous layers can be employed also.

Having now particularly described and ascertained the nature of my said invention, and in what manner the same is to be performed, I declare that what I claim is:—

A method of manufacturing stratified fibrous materials consisting in impregnating the sheets with oil, overlaying the oiled sheets with resin, superposing the sheets and subjecting the same to heat and pressure.

In testimony whereof I affix my signature in the presence of two witnesses.

MAX MEIROWSKY.

Witnesses:
 LOUIS VANDORF,
 HANS STUMGES.